(12) United States Patent
Ozue

(10) Patent No.: US 6,563,664 B1
(45) Date of Patent: May 13, 2003

(54) MAGNETIC SIGNAL RECORDING AND REPRODUCING APPARATUS AND MAGNETIC SIGNAL RECORDING AND REPRODUCING METHOD

(75) Inventor: Tadashi Ozue, Kanagawa (JP)

(73) Assignee: Sony Corporation, Tokyo (JP)

( * ) Notice: Subject to any disclaimer, the term of this patent is extended or adjusted under 35 U.S.C. 154(b) by 407 days.

(21) Appl. No.: 09/583,278

(22) Filed: May 31, 2000

(30) Foreign Application Priority Data

May 31, 1999 (JP) .......................................... 11-152925

(51) Int. Cl.[7] .............................................. G11B 5/584
(52) U.S. Cl. ..................................... 360/77.13; 360/84
(58) Field of Search ............................... 360/77.13, 64, 360/76, 84

(56) References Cited

U.S. PATENT DOCUMENTS

| | | | | |
|---|---|---|---|---|
| 4,758,911 A | * | 7/1988 | Nakano et al. ................ | 360/64 |
| 5,793,561 A | * | 8/1998 | Ibaraki et al. ................ | 360/84 |
| 5,973,875 A | * | 10/1999 | Hughes et al. ........... | 360/77.13 |
| 5,978,166 A | * | 11/1999 | Nakagawara et al. ......... | 360/76 |
| 5,986,846 A | * | 11/1999 | Goker ..................... | 360/77.13 |

* cited by examiner

Primary Examiner—David Hudspeth
Assistant Examiner—Fred F. Tzeng
(74) Attorney, Agent, or Firm—Sonnenschein, Nath & Rosenthal

(57) ABSTRACT

There are provided an approximately cylindrical rotary drum, a magnetic field applying means and a magnetic field detecting means that are mounted on the rotary drum, signal processing means, and a tracking control means for performing a tracking control based on tracking signals. The magnetic field applying means records an information signal on a portion of a recording track in a state that the tracking control is performed. The magnetic field detecting means detects signals from recording tracks by tracing a recording track plural times in a state that the tracking control is performed. The signal processing means reproduces an information signal by performing prescribed signal processing on the signals detected by the magnetic field detecting means.

2 Claims, 5 Drawing Sheets

MAGNETIC SIGNAL RECORDING AND REPRODUCING APPARATUS AND MAGNETIC SIGNAL RECORDING AND REPRODUCING METHOD

BACKGROUND OF THE INVENTION

1. Field of the Invention

The present invention relates to a magnetic signal recording and reproducing apparatus and a magnetic signal recording and reproducing method for recording and reproducing an information signal on and from a magnetic tape.

2. Description of the Related Art

In magnetic signal recording and reproducing apparatuses using a magnetic tape as a recording medium such as video tape recorders, audio tape recorders, and data storage systems for computers, the helical scan scheme is employed to increase the recording density and hence the recording capacity.

A magnetic tape for the helical scan scheme is formed with recording tracks on which an information signal is recorded in a direction that forms a prescribed angle (azimuth angle) with the longitudinal direction of the tape.

A reproduction magnetic head reproduces an information signal from the magnetic tape by tracing recording tracks. At this time, to allow the magnetic head to reproduce an information signal correctly from the magnetic tape, a tracking control needs to be performed so that the magnetic head traces recording tracks correctly.

To perform tracking correctly, it is necessary to precisely control a magnetic tape feeding system, the rotation phase of a rotary drum, etc. and hence the apparatus configuration becomes complex. As for the magnetic tape, to allow a magnetic head to trace recording tracks correctly, it is necessary that the recording track width be larger than a certain value, which prevents the recording density from being increased.

In contrast, what is called a non-tracking magnetic signal recording and reproducing apparatus has been proposed which can reproduce an information signal from a magnetic tape without the need for performing a tracking control.

In the non-tracking magnetic signal recording and reproducing apparatus, an information signal on recording tracks is detected by tracing the recording tracks at a double density by using a plurality of (e.g., two) reproduction magnetic heads for one recording magnetic head. The information signal is reproduced by recombining resulting signals on a memory.

However, in the above-described non-tracking recording and reproduction, recombining reproduction data on the memory requires that the magnetic heads perform tracing plural times. Therefore, it is necessary to use a large-capacity memory as the memory for recombining of reproduction data. Further, since no tracking control is performed, the number of times of tracing to be performed by the magnetic heads to recombine reproduction data on the memory is indefinite. Therefore, if the memory capacity for recombining of reproduction data is insufficient, overflow may occur in the memory.

In view of the above, the present inventors have proposed, in Japanese Unexamined Patent Publication No. Hei. 9-171605, a scheme in which a signal for tracking is provided in a portion of each recording track of a magnetic tape and tracking is performed only on those locations.

However, the conventional recording and reproducing scheme has a problem that it is difficult to insert-rewrite only information to a portion of a recording track because it is unknown at which position on the recording track a magnetic head is made on-track or off-track.

SUMMARY OF THE INVENTION

The present invention has been made in view of the above circumstances in the art, and an object of the invention is therefore to provide a magnetic signal recording and reproducing apparatus and a magnetic signal recording and reproducing method that can decrease the track width and increase the recording density as well as can insert-rewrite information to a portion of each recording track.

The invention provides a helical scan type magnetic signal recording and reproducing apparatus which records and reproduces an information signal on and from a magnetic tape on which tracking signals for tracking control are recorded on portions of respective recording tracks, comprising a rotary drum that is approximately cylindrical; magnetic field applying means mounted on the rotary drum, for magnetically recording an information signal on the magnetic tape; magnetic field detecting means mounted on the rotary drum, for magnetically detecting signals from the magnetic tape; signal processing means for reproducing an information signal by performing prescribed signal processing on the signals detected by the magnetic field detecting means; and tracking control means for performing a tracking control on the magnetic field applying means or the magnetic field detecting means based on the tracking signals during recording of the information signal or reproduction on or from the magnetic tape, wherein the magnetic field applying means records the information signal on a portion of a recording track in a state that the tracking control is performed by the tracking control means; the magnetic field detecting means detects the signals from a recording track by tracing the recording track plural times in a state that the tracking control is performed by the tracking control means; and the signal processing means reproduces an information signal by performing prescribed signal processing on signals detected by the magnetic field detecting means.

In the above magnetic signal recording and reproducing apparatus according to the invention, since the tracking control means for performing a tracking control on the magnetic field applying means or the magnetic field detecting means based on the tracking signals is provided, the positioning of a magnetic tape is clarified during recording or reproduction. In this magnetic signal recording and reproducing apparatus, when the magnetic field applying means records an information signal on a portion of a recording track, the magnetic field applying means is made on-track at a prescribed position of the recording track almost without fail.

Further, in the above magnetic signal recording and reproducing apparatus, since the signal processing means for reproducing an information signal by performing prescribed signal processing on signals detected by the magnetic field detecting means is provided, an information signal is reproduced from a magnetic tape even if an off-track state occurs during reproduction.

The invention also provides a magnetic signal recording and reproducing method for recording and reproducing, according to a helical scan scheme, an information signal on and from a magnetic tape on which tracking signals for tracking control are recorded in portions of respective recording tracks, comprising the steps of causing magnetic field applying means to record an information signal on portions of respective recording tracks of the magnetic tape while performing a tracking control based on the tracking signals; and causing magnetic field detecting means to detect signals from recording tracks of the magnetic tape by tracing the recording tracks plural times while performing a tracking control based on the tracking signals, and reproducing an information signal by performing prescribed signal processing on the detected signals.

In the above magnetic signal recording and reproducing method according to the invention, since a tracking control is performed based on the tracking signals, the positioning of a magnetic tape is clarified during recording or reproduction. In this magnetic signal recording and reproducing method, when the magnetic field applying means records an information signal on a portion of a recording track, the magnetic field applying means is made on-track at a prescribed position of the recording track almost without fail.

Further, in the above magnetic signal recording and reproducing method, since prescribed signal processing is performed on signals detected by the magnetic field detecting means, an information signal is reproduced from a magnetic tape even if an off-track state occurs during reproduction.

DETAILED DESCRIPTION OF THE PREFERRED EMBODIMENTS

An embodiment of the invention will be hereinafter described in detail with reference to the accompanying drawings.

A magnetic signal recording and reproducing apparatus according to the invention uses a magnetic tape as a recording medium, and is used as a video tape recorder, an audio tape recorder, a data storage system for a computer, or the like. The magnetic signal recording and reproducing apparatus according to the invention is a helical scan type magnetic signal recording and reproducing apparatus that performs recording and reproduction using a rotary drum.

Figure 1:
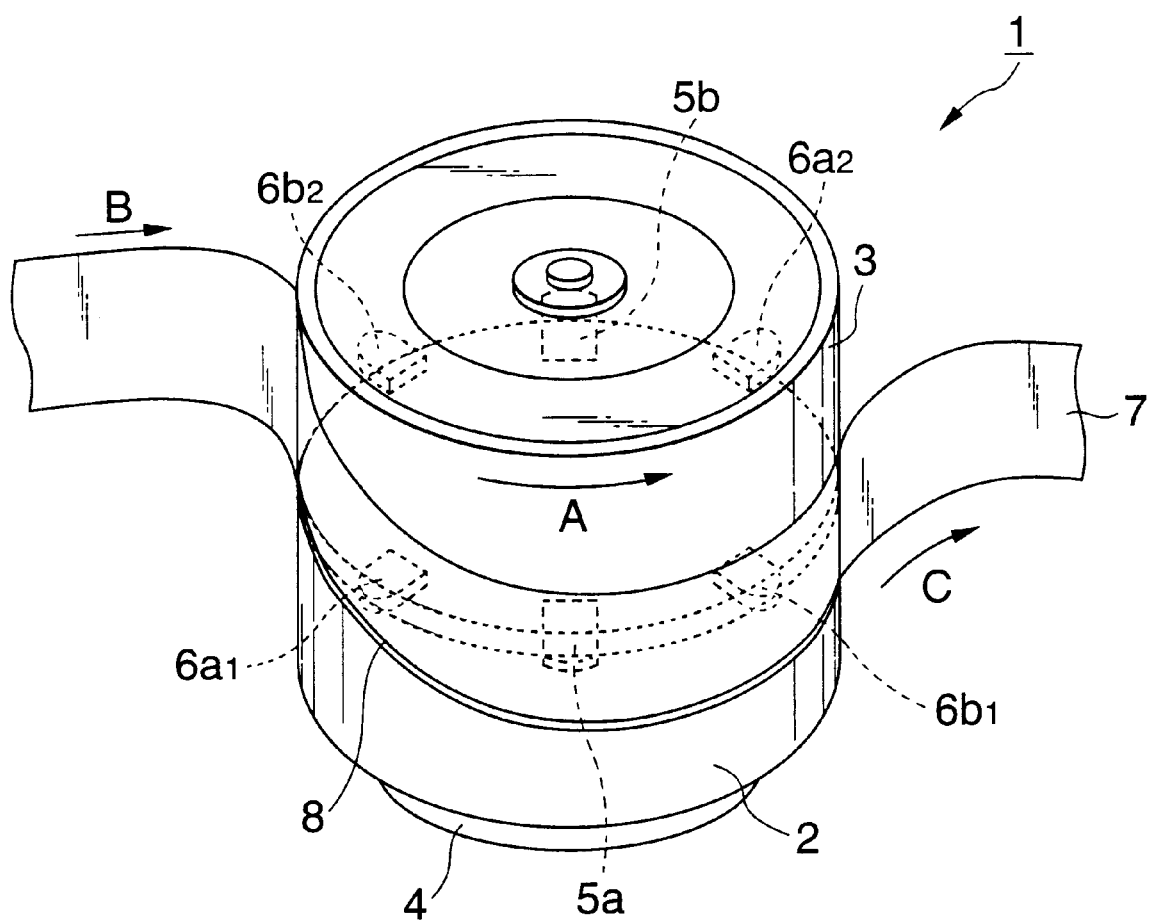
FIG. 1 is a perspective view outlining the configuration of an example rotary drum device that is mounted in a magnetic signal recording and reproducing apparatus according to the present invention.

FIG. 1 shows the configuration of an example rotary drum device that is mounted in the magnetic signal recording and reproducing apparatus according to the invention. FIG. 1 is a perspective view outlining a rotary drum device 1. As shown in FIG. 1, the rotary drum device 1 is provided with a cylindrical fixed drum 2, a cylindrical rotary drum 3, a motor 4 for rotationally driving the rotary drum 3, recording magnetic heads 5a and 5b mounted on the rotary drum 3, and reproduction magnetic heads $6a_1$, $6a_2$, $6b_1$, and $6b_2$ mounted on the rotary drum 3.

Although the rotary drum device 1 of this embodiment is of what is called a top drum type device in which the rotary drum 3 is provided above the fixed drum 2, the invention is broadly applicable to helical scan type magnetic signal recording and reproducing apparatuses and the rotary drum device may be of any type. For example, what is called a mid-drum type rotary drum device may be used in which a rotary drum is held between a pair of fixed drums.

In the rotary drum device 1, the fixed drum 2 is a drum that is held so as not to rotate. The side surface of the fixed drum 2 is formed with a lead guide portion 8 along the running direction of a magnetic tape 7. As described later, the magnetic tape 7 runs along the lead guide portion 8 during recording or reproduction. The rotary drum 3 is disposed so as to share the central axis with the fixed drum 2.

The rotary drum 3 is a drum that is rotationally driven by the motor 4 at a prescribed rotation speed during recording or reproduction on the magnetic tape 7. The rotary drum 3 has a cylindrical shape that is approximately the same in diameter as the fixed drum 2, and shares the central axis with the fixed drum 2. The rotary drum 3 is mounted with the recording magnetic heads 5a and 5b and the reproduction magnetic heads $6a_1$, $6a_2$, $6b_1$, and $6b_2$ on the side where it faces the fixed drum 2.

Each of the recording magnetic heads 5a and 5b is an inductive magnetic head in which paired magnetic cores are joined to each other with a magnetic gap formed in between and a coil is wound around the magnetic cores.

The recording magnetic heads 5a and 5b are mounted on the rotary drum 3 in such a manner that their magnetic gap portions project from the outer circumferential surface of the rotary drum 3. The azimuth angles of the recording magnetic heads 5a and 5b are set opposite to each other so that guard-band-less recording is performed at prescribed azimuth angles with respect to the magnetic tape 7.

The recording magnetic heads 5a and 5b can use any of known recording magnetic heads that are employed in conventional helical scan type magnetic signal recording and reproducing apparatuses. In particular, what is called an MIG (metal in gap) magnetic head is suitable in which paired magnetic cores each of which is composed of a soft magnetic member of ferrite or the like and a metal magnetic film formed on the soft magnetic member are jointed to each other with a magnetic gap formed in between so that the metal magnetic films are opposed to each other.

For example, each of the reproduction magnetic heads $6a_1$, $6a_2$, $6b_1$, and $6b_2$ is a magnetoresistive head (hereinafter referred to as "MR head") which detects an information signal from the magnetic tape 7 utilizing the magnetoresistive effect.

In general, the MR head is suitable for high-density recording because it is more sensitive and produces a larger reproduction output than the inductive magnetic head which performs recording and reproduction utilizing electromagnetic induction. Therefore, the use of MR heads as the reproduction magnetic heads $6a_1$, $6a_2$, $6b_1$, and $6b_2$ enables higher-density recording.

Like the recording magnetic heads 5a and 5b, the reproduction magnetic heads $6a_1$ and $6a_2$ and the reproduction magnetic heads $6b_1$ and $6b_2$ are given opposite azimuth angles so as to be able to detect a magnetic signal that was guard-band-less-recorded at prescribed azimuth angles with respect to the magnetic tape 7.

The reproduction magnetic heads $6a_1$ and $6a_2$ are mounted on the rotary drum 3 in such a manner that they form 180° about the center axis of the rotary drum 3 and the magnetic gap portions project from the outer circumferential surface of the rotary drum 3. Similarly, the reproduction magnetic heads $6b_1$ and $6b_2$ are mounted on the rotary drum 3 in such a manner that they form 180° about the center axis of the rotary drum 3 and the magnetic gap portions project from the outer circumferential surface of the rotary drum 3.

Figure 2:
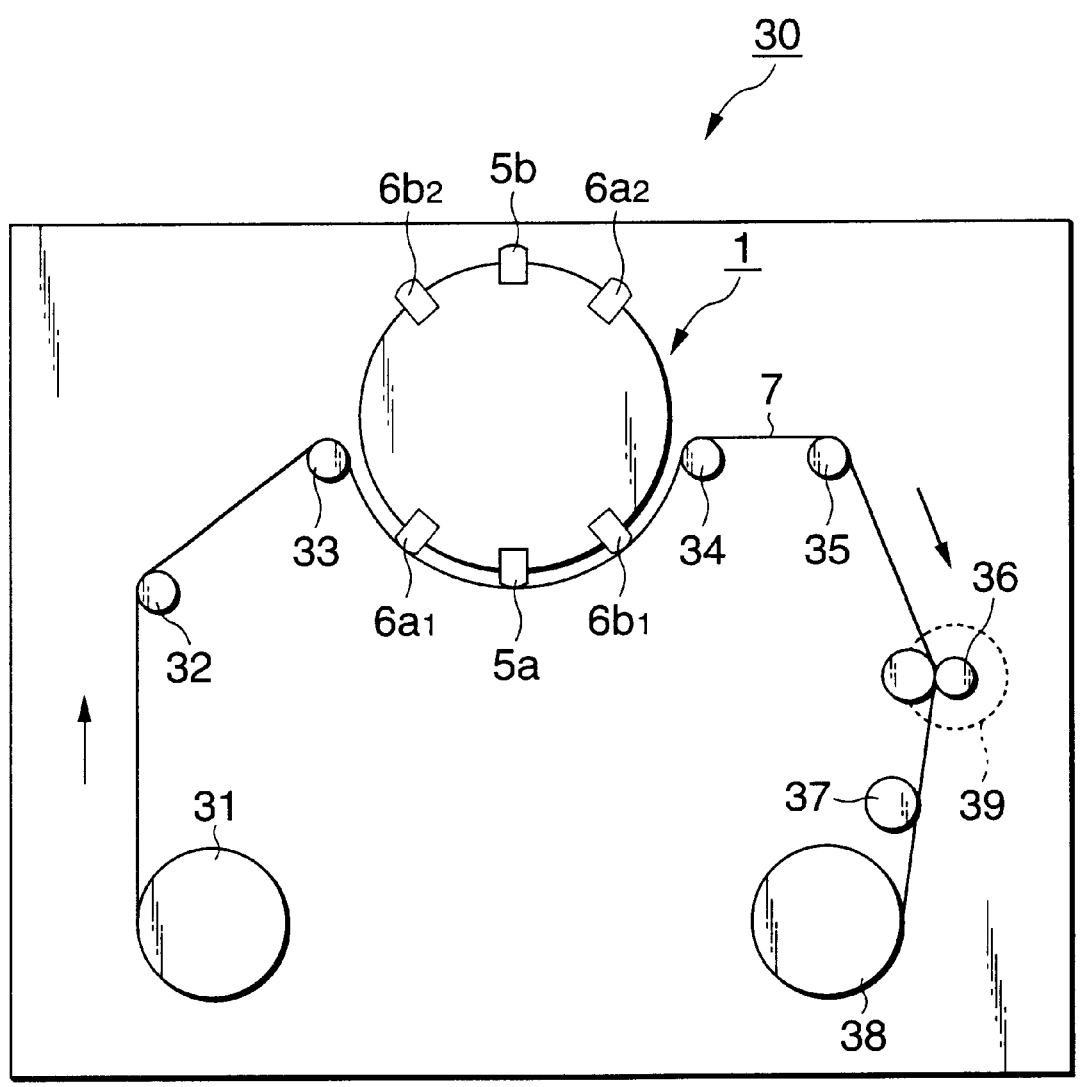
FIG. 2 is a plan view outlining the configuration of an example magnetic tape feeding mechanism including the rotary drum device of FIG. 1.

As shown in FIG. 2, the magnetic signal recording and reproducing apparatus records or reproduces data on and from the magnetic head by bringing the magnetic tape 7 into sliding contact with the rotary drum device 1. FIG. 2 is a plan view outlining a magnetic tape feeding mechanism 30 including the rotary drum device 1. Specifically, as shown in FIG. 2, during recording or reproduction the magnetic tap 7 is fed from a supply reel 31 to the rotary drum device 1 via guide rollers 32 and 33 so as to be wound on the rotary drum device 1 and is subjected to recording and reproduction by the rotary drum device 1.

Figure 3:
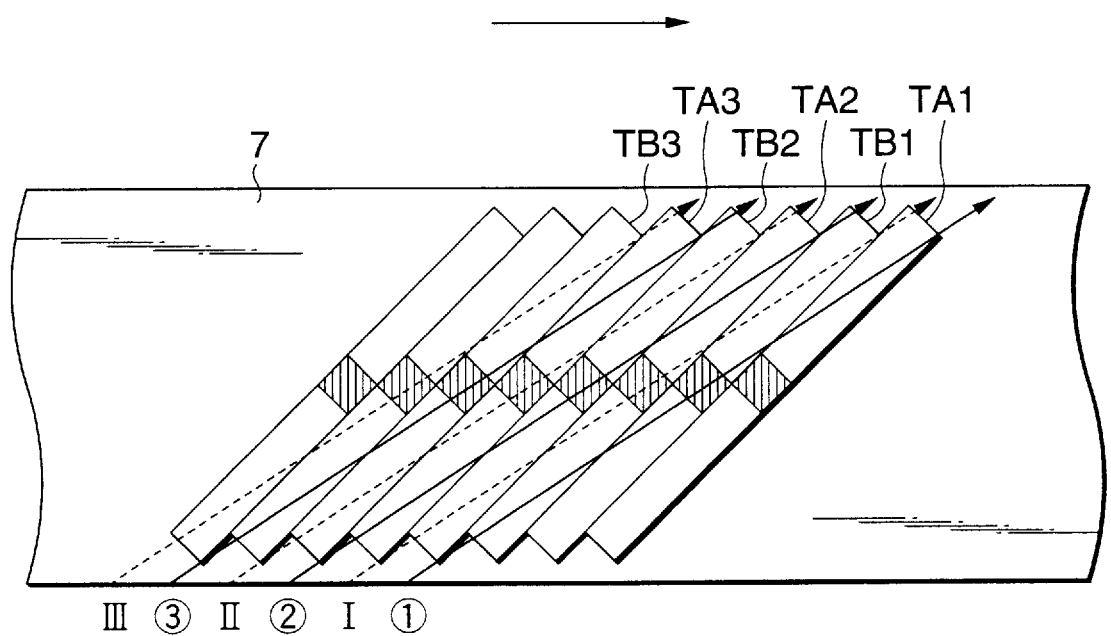
FIG. 3 shows scanning loci of magnetic heads during recording or reproduction.

For example, data-recorded recording tracks TA1, TB1, TA2, TB2, . . . are formed as shown in FIG. 3. Tracks TA1, TA2, TA3, . . . have an azimuth angle at which recording can be performed by the recording magnetic head 5a and reproduction can be performed by the reproduction magnetic heads $6a_1$ and $6a_2$. Tracks TB1, TB2, TB3, . . . have an azimuth angle at which recording can be performed by the recording magnetic head 5b and reproduction can be performed by the reproduction magnetic heads $6b_1$ and $6b_2$.

As shown in FIG. 3, a tracking signal is recorded on a portion of each azimuth-recorded recording track, for example, on a block located approximately at the center of each recording track. The blocks in which tracking signals are recorded are hatched in FIG. 3. During recording or reproduction, the blocks in which tracking signals are recorded are scanned each time and the tracking signals are detected. A tracking control is performed based on the detected tracking signals. By performing a tracking control during recording or reproduction, the positioning of the magnetic tape 7 during recording or reproduction is clarified and hence the off-track amount of the magnetic heads can be suppressed.

The signal for tracking control may be one that is usually employed in conventional helical scan type magnetic signal recording and reproducing apparatuses. For example, the tracking signal may be an ATF (automatic tracking following) signal.

In the ATF tracking control using the ATF signal, a tracking control is performed by recording an ATF signal in a portion of each track, obtaining an ATF error signal by comparing it with a crosstalk component of the ATF signal that is obtained from an adjacent track, and adding the ATF error signal to the speed error of the capstan servo.

Physical tape information such as a track number and other various kinds of information such as a particular video signal and audio signal or data including an identification number that is necessary to construct those particular video signal and audio signal are recorded in each tracking-signal-recorded block. Part or all of those signals may be digital signals.

As for the reproduction of data from the magnetic tape 7, the reproduction magnetic heads $6a_1$, $6a_2$, $6b_1$, and $6b_2$ are brought into sliding contact with the magnetic tape 7 and data recorded on the magnetic tape 7 is reproduced by the reproduction magnetic heads $6a_1$, $6a_2$, $6b_1$, and $6b_2$.

In the rotary drum device 1, the reproduction magnetic heads $6a_1$, $6a_2$, $6b_1$, and $6b_2$ are provided in the number that is twice the number of recording magnetic heads 5a and 5b and the reproduction magnetic heads $6a_1$ and $6a_2$ and the reproduction magnetic heads $6b_1$ and $6b_2$ have different azimuth angles. Therefore, even if the scanning loci of the reproduction magnetic heads $6a_1$, $6a_2$, $6b_1$, and $6b_2$ go out of recording tracks during reproduction of an information signal from the magnetic tape 7, the information signal can still be reproduced from the magnetic tape 7.

As described above, the recording tracks TA1, TA2, TA3, . . . having the azimuth angle at which the reproduction magnetic heads $6a_1$ and $6a_2$ can perform reproduction and the recording tracks TB1, TB2, TB3, . . . having the azimuth angle at which the reproduction magnetic heads $6b_1$ and $6b_2$ can perform reproduction are formed alternately on the magnetic tape 7.

Now, a description will be made of reproduction from a specific track TA2 having the recording azimuth angle at which the paired reproduction magnetic heads $6a_1$ and $6a_2$ can perform reproduction. Assume that one reproduction magnetic head $6a_1$ scans the magnetic tape 7 with locus ① first and then scans the magnetic tape 7 with locus ② after one rotation of the rotary drum 3. Also assume that thereafter the reproduction magnetic head $6a_1$ scans the magnetic tape 7 with loci ③, . . . at intervals corresponding to one rotation of the rotary drum 3. Loci ①, ②, ③, . . . deviate from each other by two track pitches, for example.

In this case, tracking signals are recorded on the blocks located approximately at the centers of the respective recording track TA1, TA2, TA3, . . . . A reproduction signal from the reproduction magnetic head $6a_1$ is supplied to a tracking control circuit as described later, whereby a tracking control is performed on the reproduction magnetic head $6a_1$. As a result, the reproduction magnetic head $6a_1$ comes to scan, almost without fail, the blocks located approximately at the centers of the respective recording tracks TA1, TA2, TA3, . . . .

The other reproduction magnetic head $6a_2$ similarly scans the magnetic tape 7. The reproduction magnetic head $6a_1$ and the reproduction magnetic head $6a_2$ scan locations that are separated from each other by about one track pitch. More specifically, after the reproduction magnetic head $6a_1$ makes a scan with locus ①, the reproduction magnetic head $6a_2$ scans, with locus I, the location that is distant from locus ① by about one track pitch. Thereafter, the reproduction magnetic head $6a_2$ scans the magnetic tape 7 at intervals corresponding to one rotation with loci II, III, . . . , which deviate from each other by two track pitches.

Figure 4:
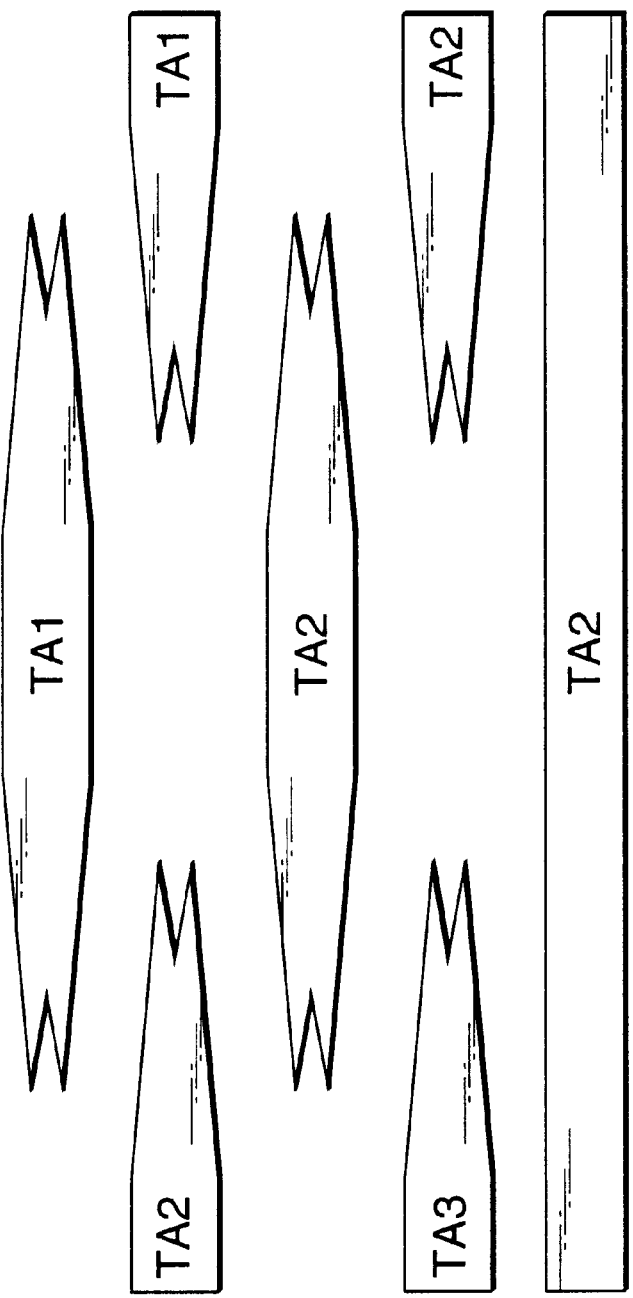
FIGS. 4A–4E show reproduction outputs of reproduction magnetic reads during reproduction.

With the scans of loci ① and ②, the reproduction magnetic head $6a_1$ produces reproduction outputs shown in FIGS. 4A and 4C, respectively. With the scans of loci I and II, the reproduction magnetic head $6a_2$ produces reproduction outputs shown in FIGS. 4B and 4D, respectively.

That is, the scan of locus ① by the reproduction magnetic head $6a_1$ reproduces part of the signal of track TA1 as shown in FIG. 4A. The scan of locus ② reproduces part of the signal of track TA2 as shown in FIG. 4C.

The scan of locus I by the reproduction magnetic head $6a_2$ first reproduces part of the signal of track TA2 and then part of the signal of track TA1 (in the second half of the scan) as shown in FIG. 4B. The scan of locus II first reproduces part of the signal of track TA3 and then part of the signal of track TA2 (in the second half of the scan) as shown in FIG. 4D.

By scanning the magnetic tape 7 at a double density by using the plurality of (two) reproduction magnetic heads $6a_1$ and $6a_2$ in the above manner, part of a signal that was not detected by a scan with one reproduction magnetic head $6a_1$ can be detected by the other reproduction magnetic head $6a_2$.

As described above, the signal recorded on track TA2 is reproduced in the form of several divisional parts by the reproduction magnetic heads $6a_1$ and $6a_2$. The signal recorded on track TA2 can be reproduced finally as shown in FIG. 4E by performing prescribed signal processing on those divisional parts of the reproduced signal.

The other pair of reproduction magnetic heads $6b_1$ and $6b_2$ having a different azimuth angle than the reproduction magnetic heads $6a_1$ and $6a_2$ can reproduce a signal from the magnetic tape 7 in the same manner as the reproduction magnetic heads $6a_1$ and $6a_2$ do. Therefore, even if an off-track state occurs, the rotary drum device 1 can reproduce an information signal from the magnetic tape 7 in the above manner.

During reproduction, the execution of a tracking control makes it possible to clarify the positioning of the magnetic tape 7 and the off-track amount of the reproduction magnetic heads $6a_1$, $6a_2$, $6b_1$, and $6b_2$ can be suppressed to less than about one track, for example.

Suppressing the off-track amount of the reproduction magnetic heads $6a_1$, $6a_2$, $6b_1$, and $6b_2$ makes it possible to clarify the number of scans that are needed to reproduce one-track data. Therefore, in the case of recombining reproduction signals on a memory by scanning a recording track plural times with the reproduction magnetic heads $6a_1$, $6a_2$, $6b_1$, and $6b_2$ there is no fear that reproduction signals may overflow the memory, which dispenses with the need for using a large-capacity memory.

Although a tracking signal is recorded in each recording track, it is not necessary to detect each tracking signal with all reproduction magnetic heads $6a_1$, $6a_2$, $6b_1$, and $6b_2$; it is sufficient to detect each tracking signal with one of the reproduction magnetic heads $6a_1$, $6a_2$, $6b_1$, and $6b_2$. In this embodiment, each tracking signal is detected by the reproduction magnetic head $6a_1$.

As for the recording of data on the magnetic tape 7, while a tracking control is performed by detecting tracking signals recorded on recording tracks with the reproduction magnetic head $6a_1$, the pair of recording magnetic heads 5a and 5b is brought into contact with the magnetic tape 7 and an information signal is recorded by the recording magnetic heads 5a and 5b. The following description will be directed to a case of insert-rewriting recording of information on a portion of each recording track.

The region on which insert-rewriting recording is performed is the tracking-signal-recorded block (hatched in FIG. 3) in each recording track. A detailed description will be made of a case of performing insert-rewriting recording on the recording track TA3 by using the recording magnetic head 5a.

In the rotary drum device 1, the recording magnetic head 5a is disposed so as to scan the magnetic tape 7 ahead of the reproduction magnetic head $6a_1$ does by two track pitches.

Referring to FIG. 3, when the reproduction magnetic head $6a_1$ scans the magnetic tape 7 with locus ①, the recording magnetic head 5a scans the magnetic head 7 with locus ②. When the reproduction magnetic head $6a_1$ scans the magnetic tape 7 with locus ②, the recording magnetic head 5a scans the magnetic head 7 with locus ③.

At this time, as described above, the reproduction magnetic head $6a_1$ detects tracking signals recorded in the blocks located approximately at the centers of the respective recording tracks TA1, TA2, and TA3 and a tracking control is performed on the reproduction magnetic head $6a_1$. In this manner, the reproduction magnetic head $6a_1$ comes to scan the blocks located approximately at the centers of the respective recording tracks TA1, TA2, and TA3 almost without fail.

The above tracking control causes the recording magnetic head 5a, which scans the magnetic head 7 at locations that are two-track pitches distant from locations that are scanned by the reproduction magnetic head $6a_1$, to also scan the blocks located approximately at the centers of the respective recording tracks TA1, TA2, and TA3 almost without fail. In this manner, insert-rewriting recording of information on the block located approximately at the center of the recording track TA3 can be performed almost without fail.

In performing insert-rewriting recording, first the reproduction magnetic head $6a_1$ scans the magnetic tape 7 with locus ① and detects a tracking signal from the recording track TA1 and such information as a track number is recognized. At this time, the recording magnetic head 5a scans the magnetic tape 7 with locus ②. Based on the recognized track number, it is judged that the recording magnetic head 5a will scan the magnetic tape 7 with locus ③ and insert-rewriting recording should be performed on track TA3 after one rotation of the rotary drum 3, that is, when the reproduction magnetic head $6a_1$ scans the magnetic tape 7 with locus ②.

After the information content has been recognized, switching is made from the reproduction mode to the recording mode. After one rotation of the rotary drum 3, the recording magnetic head 5a scans the magnetic tape 7 with locus ③ and insert-rewriting recording of information is performed on the block located approximately at the center of track TA3.

Insert-rewriting recording that uses the recording magnetic head 5b can be performed in the same manner as described above.

In the case of performing insert-rewriting recording on a plurality of recording tracks, the above-described operation may be performed repeatedly. In this case, it is preferable that recording be performed in what is called an RAW (read after write) mode in which information is reproduced immediately after its recording to check whether the information was recorded correctly.

In this magnetic signal recording and reproducing apparatus, the execution of a tracking control during recording makes it possible to clarify positions where the recording magnetic heads 5a and 5b are made on-track on a recording track of the magnetic tape 7, whereby insert-rewriting recording on information recorded at a prescribed position on the recording track concerned can be performed easily.

Next, the recording and reproduction by the rotary drum device 1 will be described with reference to FIG. 5 which outlines the circuit configuration of the rotary drum device 1 and its peripheral circuits.

In recording data on the magnetic tape 7 using the rotary drum device 1, first a current is supplied to the driving coil of the motor 4 and thereby the rotary drum 3 is driven rotationally. In the state that the rotary drum 3 is rotating, a recording signal is supplied from an external circuit 40 to an encoder 41 (see FIG. 5).

The encoder 41 encodes the received recording signal and adds prescribed error correcting codes to the resulting signal. That is, the encoder 41 serves as an error correcting code adding means for coding a recording signal that is supplied from the external circuit 40 and adding error correcting codes to data to be recorded on the magnetic tape 7. The data to which error correcting codes have been added by the encoder 41 is supplied to a modulation circuit 42.

The modulation circuit 42 modulates the data supplied from the encoder 41 into data that is a DC-free code sequence, for example.

The data (DC-free code sequence) that is output from the modulation circuit 42 is supplied to a recording amplifier 43a or 43b. The modulation circuit 42 supplies the data to the recording amplifier 43a or 43b in synchronism with the rotation of the rotary drum 3. More specifically, the modulation circuit 42 supplies the data to the recording amplifier 43a corresponding to one recording magnetic head 5a at time points when the data is to be recorded by the recording magnetic head 5a, and supplies the data to the recording amplifier 43b corresponding to the other recording magnetic head 5b at time points when the data is to be recorded by the recording magnetic head 5b.

When receiving the data (DC-free code sequence) from the modulation circuit 42, the recording amplifier 43a amplifies a recording signal corresponding to the data to a prescribed level and supplies the resulting signal to a signal transmission ring 44a. Similarly, when receiving the data (DC-free code sequence) from the modulation circuit 42, the recording amplifier 43b amplifies a recording signal corresponding to the data to a prescribed level and supplies the resulting signal to a signal transmission ring 44b.

The recording signal that has been supplied to the signal transmission ring 44a corresponding to one recording magnetic head 5a is transmitted to a signal transmission ring 45a in a non-contact manner. The recording signal that has been transmitted to the signal transmission ring 45a is supplied to the recording magnetic head 5a and the data is recorded on the magnetic tape 7 by the recording magnetic head 5a.

Similarly, the recording signal that has been supplied to the signal transmission ring 44b corresponding to the other recording magnetic head 5b is transmitted to a signal transmission ring 45b in a non-contact manner. The recording signal that has been transmitted to the signal transmission ring 45b is supplied to the recording magnetic head 5b and the data is recorded on the magnetic tape 7 by the recording magnetic head 5b.

On the other hand, in reproducing data from the magnetic tape 7 by using the rotary drum device 1, first a current is supplied to the driving coil of the motor 4 and the rotary drum 3 is driven rotationally as in the case of recording data. In the state that the rotary drum 3 is rotating, a high-frequency current is supplied from an oscillator 46 to a power drive 47 (see FIG. 5). The high-frequency current supplied from the oscillator 46 is converted by the power drive 47 into a prescribed AC current, which is supplied to a power transmission ring 48.

The AC current that has been supplied to the power transmission ring 48 is transmitted to a power transmission ring 49 in a non-contact manner. The AC current that has been supplied to the power transmission ring 49 is rectified by a rectifier 50 into a DC current, which is supplied to a regulator 51 and for which the regulator 51 sets a prescribed voltage.

The current for which the prescribed voltage has been set by the regulator 51 is supplied to the reproduction magnetic heads $6a_1$, $6a_2$, $6b_1$, and $6b_2$.

A reproduction amplifier $52a_1$ for detecting a signal from the reproduction magnetic head $6a_1$ is connected to the reproduction magnetic head $6a_1$. A current is also supplied from the regulator 51 to the reproduction amplifier $52a_1$. A reproduction amplifier $52a_2$ for detecting a signal from the reproduction magnetic head $6a_2$ is connected to the reproduction magnetic head $6a_2$. A current is also supplied from the regulator 51 to the reproduction amplifier $52a_2$.

A reproduction amplifier $52b_1$ for detecting a signal from the reproduction magnetic head $6b_1$ is connected to the reproduction magnetic head $6b_1$. A current is also supplied from the regulator 51 to the reproduction amplifier $52b_1$. A reproduction amplifier $52b_2$ for detecting a signal from the reproduction magnetic head $6b_2$ is connected to the reproduction magnetic head $6b_2$. A current is also supplied from the regulator 51 to the reproduction amplifier $52b_2$.

A reproduction signal of the reproduction amplifier $52a_1$ is supplied to a signal transmission ring $53a_1$, which transmits the received reproduction signal to a signal transmission ring $54a_1$ in a non-contact manner.

The reproduction signal that has been transmitted to the signal transmission ring $54a_1$ is supplied to a reproduction amplifier $55a_1$, amplified by the reproduction amplifier $55a_1$, and then supplied to a detection circuit $56a_1$. The detection circuit $56a_1$ detects data (code sequence) from the reproduction signal supplied from the reproduction amplifier $55a_1$. The data recorded on the magnetic tape 7 is data that has been converted into a DC-free code sequence. Therefore, the data detected by the detection circuit $56a_1$ is a DC-free code sequence.

The data that has been detected by the detection circuit $56a_1$ is supplied, as reproduction data $A_1$, to a signal processing circuit 57 and subjected to error correction processing etc. there.

The data that has been detected by the detection circuit $56a_1$ is also supplied to an ATF detection circuit 60. The ATF detection circuit 60 produces an ATF error signal by comparing an ATF signal and a crosstalk component of the ATF signal that is obtained from an adjacent track that are included in the data detected by the detection circuit $56a_1$.

The ATF error signal that has been produced by the ATF detection circuit 60 is supplied to a mechanical controller 61. The mechanical controller 61 performs a tracking control by adding the ATF error signal that is supplied from the ATF detection circuit 60 to the speed error of the capstan servo.

A reproduction signal of the reproduction amplifier $52a_2$ is supplied to a signal transmission ring $53a_2$, which transmits the received reproduction signal to a signal transmission ring $54a_2$ in a non-contact manner.

The reproduction signal that has been transmitted to the signal transmission ring $54a_2$ is supplied to a reproduction amplifier $55a_2$, amplified by the reproduction amplifier $55a_2$, and then supplied to a detection circuit $56a_2$. The detection circuit $56a_2$ detects data (code sequence) from the reproduction signal supplied from the reproduction amplifier $55a_2$.

The data that has been detected by the detection circuit $56a_2$ is supplied, as reproduction data $A_2$, to the signal processing circuit 57 and subjected to error correction processing etc. there.

A reproduction signal of the reproduction amplifier $52b_1$ is supplied to a signal transmission ring $53b_1$, which transmits the received reproduction signal to a signal transmission ring $54b_1$ in a non-contact manner.

The reproduction signal that has been transmitted to the signal transmission ring $54b_1$ is supplied to a reproduction amplifier $55b_1$, amplified by the reproduction amplifier $55b_1$, and then supplied to a detection circuit $56b_1$. The detection circuit $56b_1$ detects data (code sequence) from the reproduction signal supplied from the reproduction amplifier $55b_1$.

The data that has been detected by the detection circuit $56b_1$ is supplied, as reproduction data $B_1$, to the signal processing circuit 57 and subjected to error correction processing etc. there.

A reproduction signal of the reproduction amplifier $52b_2$ is supplied to a signal transmission ring $53b_2$, which transmits the received reproduction signal to a signal transmission ring $54b_2$ in a non-contact manner.

The reproduction signal that has been transmitted to the signal transmission ring $54b_2$ is supplied to a reproduction amplifier $55b_2$, amplified by the reproduction amplifier $55b_2$, and then supplied to a detection circuit $56b_2$. The detection circuit $56b_2$ detects data (code sequence) from the reproduction signal supplied from the reproduction amplifier $55b_2$.

The data that has been detected by the detection circuit $56b_2$ is supplied, as reproduction data $B_2$, to the signal processing circuit 57 and subjected to error correction processing etc. there.

The above error correction processing makes it possible to reproduce original data even if a reproduction signal includes missing portions as long as the number of missing portions is not unduly large.

Figure 5:
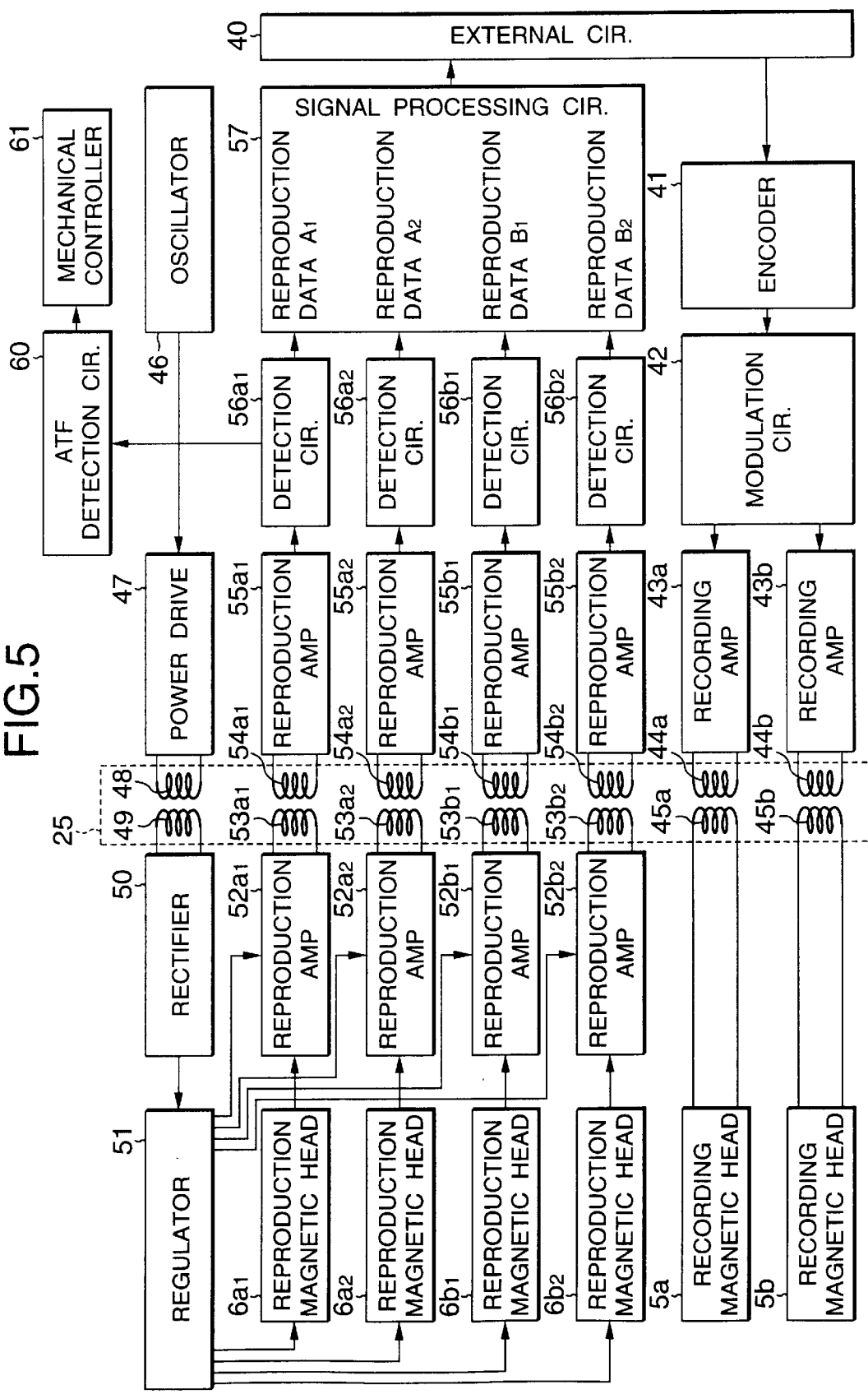
FIG. 5 outlines the circuit configuration of the rotary drum device of FIG. 1 and its peripheral circuits.

With the circuit configuration of FIG. 5, the pair of recording magnetic heads 5a and 5b, the two pairs of reproduction magnetic heads $6a_1$, $6a_2$, $6b_1$, and $6b_2$, the rectifier 50, the regulator 51, and the reproduction amplifiers $52a_1$, $52a_2$, $52b_1$, and $52b_2$ are mounted on and rotated together with the rotary drum 3. On the other hand, the encoder 41, the modulation circuit 42, the recording amplifiers 43a and 43b, the oscillator 46, the power drive 47, the reproduction amplifiers $55a_1$, $55a_2$, $55b_1$, and $55b_2$, the detection circuits $56a_1$, $56a_2$, $56b_1$, and $56b_2$, and the signal processing circuit 57 are mounted on the fixed portion of the rotary drum device 1 or made external circuits that are separated from the rotary drum device 1.

As shown in FIG. 2, a portion of the magnetic tape 7 that has been subjected to recording or reproduction by the rotary drum device 1 is fed to a take-up roller 38 via guide rollers 34 and 35, a capstan 36, and a guide roller 37. That is, the magnetic tape 7 is fed, with a prescribed speed and tension, by the capstan 36 that is rotationally driven by a capstan motor 39, brought into sliding contact of prescribed contact pressure with the recording magnetic heads 5a and 5b and the reproduction magnetic heads $6a_1$, $6a_2$, $6b_1$, and $6b_2$ that are mounted on the rotary drum 3 that is driven rotationally, and is taken up by the take-up roller 38.

In this manner, in the rotary drum device 1, the capstan 36 that is rotationally driven by the capstan motor 39 serves as a contact pressure control means for controlling the contact pressure that acts between the magnetic tape 7 and the recording magnetic heads 5a and 5b and the reproduction magnetic heads $6a_1$, $6a_2$, $6b_1$, and $6b_2$.

When the magnetic tape 7 is fed in the above manner, the rotary drum 3 is rotationally driven by the motor 4 as indicated by arrow A in FIG. 1. On the other hand, the magnetic tape 7 is fed in such a manner as to slide obliquely with respect to the fixed drum 2 and the rotary drum 3 along the lead guide portion 8 of the fixed drum 2. That is, the magnetic tape 7 is fed from the tape input side in the tape running direction along the lead guide portion 8 in such a manner as to be brought into sliding contact with the fixed drum 2 and the rotary drum 3 as indicated by arrow B in FIG. 1, and fed to the tape output side as indicated by arrow C in FIG. 1.

As described above, provided with the plurality of reproduction magnetic heads $6a_1$, $6a_2$, $6b_1$, and $6b_2$ having different azimuth angles, this magnetic signal recording and reproducing apparatus can reproduce an information signal from the magnetic tape 7 even when an off-track state occurs. This makes it possible to decrease the recording track width and thereby increase the recording density.

In this magnetic signal recording and reproducing apparatus, the positioning of the magnetic tape 7 is clarified by performing a tracking control during reproduction based on tracking signals that are recorded on portions of respective recording tracks and hence the off-track amount of the reproduction magnetic heads $6a_1$, $6a_2$, $6b_1$, and $6b_2$ can be suppressed. Therefore, this magnetic signal recording and reproducing apparatus dispenses with the need for using a large-capacity memory in recombining, on a memory, reproduction signals detected by the respective reproduction magnetic heads $6a_1$, $6a_2$, $6b_1$, and $6b_2$.

Further, in this magnetic signal recording and reproducing apparatus, during recording the recording magnetic heads 5a and 5b can be made on-track at prescribed positions on recording tracks of the magnetic tape 7 by performing a tracking control based on tracking signals recorded in portions of respective recording tracks. This makes it possible to easily perform insert-rewriting recording on information recorded at a prescribed position on the recording track concerned.

Although the above embodiment is directed to the case where a tracking signal is recorded on a block that is located approximately at the center of each recording track, the invention is not limited to such a case. The tracking signal recording position is not limited to the above; for example, the invention can also be applied to a case where a recording signal is recorded on a block located at the end in the longitudinal direction of each recording track.

In the invention, a plurality of reproduction magnetic heads having different azimuth angles are used in reproducing information from a magnetic tape and detected signals are subjected to prescribed recombination processing. This makes it possible to reproduce an information signal from a magnetic tape even when an off-track state occurs during reproduction. Further, by performing a tracking control during reproduction, the invention clarifies the positioning of a magnetic tape and hence can suppress increase in memory capacity.

By performing a tracking control during recording, the invention clarifies positions where the recording magnetic heads are made on-track on recording tracks of a magnetic tape and hence makes it possible to easily perform insert-rewriting recording on information recorded at a prescribed position on the recording track concerned.

What is claimed is:

1. A helical scan type magnetic signal recording and reproducing apparatus which records and reproduces an information signal on and from a magnetic tape on which tracking signals for tracking control are recorded on portions of respective recording tracks, comprising:

a rotary drum that is approximately cylindrical;

magnetic field applying means mounted on the rotary drum, for magnetically recording an information signal on the magnetic tape;

magnetic field detecting means mounted on the rotary drum, for magnetically detecting signals from the magnetic tape;

signal processing means for reproducing an information signal by performing prescribed signal processing on the signals detected by the magnetic field detecting means; and tracking control means for performing a tracking control on one of the magnetic field applying means and the magnetic field detecting means based on the tracking signals during one of recording of the information signal and reproduction on one of on and from the magnetic tape;

wherein the magnetic field applying means records the information signal on a portion of a recording track in a state that the tracking control is performed by the tracking control means; and wherein the magnetic field detecting means detects signals from a recording track by tracing the recording track plural times in a single revolution of said rotary drum, in a state that the tracking control is performed by the tracking control means.

2. A magnetic signal recording and reproducing method for recording and reproducing, according to a helical scan scheme, an information signal on and from a magnetic tape on which tracking signals for tracking control are recorded in portions of respective recording tracks, comprising:

recording an information signal using magnetic field applying means on a portion of a recording track of the magnetic tape while performing a tracking control based on the tracking signals; and detecting signals from a recording track of the magnetic tape using magnetic field detecting means, by tracing the recording track plural times during a single revolution of said rotary drum, in while performing a tracking control based on the tracking signals, and reproducing an information signal by performing prescribed signal processing on the detected signals.

* * * * *